(12) United States Patent
Kamitani et al.

(10) Patent No.: US 9,868,386 B2
(45) Date of Patent: Jan. 16, 2018

(54) VEHICLE HEADLIGHT CONTROL DEVICE AND METHOD, AND VEHICLE HEADLIGHT CONTROL SYSTEM

(75) Inventors: Tomoyuki Kamitani, Nagoya (JP); Ryu Mizuno, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 597 days.

(21) Appl. No.: 14/361,373

(22) PCT Filed: Aug. 24, 2012

(86) PCT No.: PCT/JP2012/071490
§ 371 (c)(1),
(2), (4) Date: May 29, 2014

(87) PCT Pub. No.: WO2013/080614
PCT Pub. Date: Jun. 6, 2013

(65) Prior Publication Data
US 2014/0286025 A1    Sep. 25, 2014

(30) Foreign Application Priority Data
Nov. 30, 2011 (JP) ................. 2011-262054

(51) Int. Cl.
*B60Q 1/115* (2006.01)

(52) U.S. Cl.
CPC ........ *B60Q 1/115* (2013.01); *B60Q 2300/132* (2013.01); *B60Q 2300/31* (2013.01); *B60Q 2300/324* (2013.01)

(58) Field of Classification Search
CPC ............... B60Q 1/115; B60Q 2300/31; B60Q 2300/132; B60Q 2300/324; B60Q 5/005;
(Continued)

(56) References Cited

U.S. PATENT DOCUMENTS 5,787,370 A    7/1998  Kutscher et al.
6,963,657 B1*  11/2005 Nishigaki ............... G01S 11/12
                                                   340/901

FOREIGN PATENT DOCUMENTS

EP    0803401 A2   10/1997
JP    H06-144108 A  5/1994
(Continued)

OTHER PUBLICATIONS

International Search Report ISA for PCT/JP2012/071490, ISA/JP, dated Nov. 20, 2012 (Japanese and English).
(Continued)

*Primary Examiner* — Stephen F Husar
(74) *Attorney, Agent, or Firm* — Harness, Dickey & Pierce, P.L.C.

(57) ABSTRACT

An absolute pitch is outputted from an inclination sensor. A gradient related quantity is outputted from a gradient related quantity detection sensor for detecting a gradient related quantity that can specify a gradient of a road surface. The absolute pitch angle and the gradient related quantity are acquired by a vehicle headlight control apparatus. Based on the absolute pitch angle and the gradient related quantity, a pitch angle of a vehicle with respect to a road surface is calculated by the vehicle headlight control apparatus. Based on the pitch angle, an optical axis direction of the head lamp is controlled by the vehicle headlight control apparatus.

10 Claims, 6 Drawing Sheets

(58) Field of Classification Search
CPC .......................... B60Q 9/00; B60Q 2300/146; B60Q 2300/45; B60Q 1/085; B60Q 2300/32; B60Q 2300/322; G07C 5/008; G07C 5/0808; H04L 67/12; G06F 8/65; H04W 4/046; G01C 21/26; G01C 21/3691; H04N 7/181; G08G 1/166; B60L 2260/44; B60R 16/037; B60R 1/00; B60W 50/085; B60W 50/14; B60Y 2300/1884; G05D 1/021; H02P 29/0011; Y02T 10/7275; Y02T 90/16; G06T 2207/30261

See application file for complete search history.

(56) References Cited

FOREIGN PATENT DOCUMENTS

| | | |
|---|---|---|
| JP | H09-286274 A | 11/1997 |
| JP | 2767220 B2 | 6/1998 |
| JP | H11-28975 A | 2/1999 |
| JP | 2001-341578 A | 12/2001 |
| JP | 2002-337600 A | 11/2002 |
| JP | 2006-027300 A | 2/2006 |
| JP | 2011-116201 A | 6/2011 |

OTHER PUBLICATIONS

Written Opinion of the ISA for PCT/JP2012/071490, ISA/JP, dated Nov. 20, 2012 (Japanese).

International Preliminary Report on Patentability dated Jun. 12, 2014 in corresponding PCT Application No. PCT/JP2012/071490.

\* cited by examiner

VEHICLE HEADLIGHT CONTROL DEVICE AND METHOD, AND VEHICLE HEADLIGHT CONTROL SYSTEM

CROSS-REFERENCE TO RELATED APPLICATION

This application is a 371 U.S. National Phase of PCT/JP2012/071490, filed Aug. 24, 2012, which is based on and claims the benefit of priority from Japanese Patent Application No. 2011-262054, filed Nov. 30, 2011, the disclosures of which are incorporated herein in their entirety by reference.

TECHNICAL FIELD

The present invention relates to a vehicle headlight control device and method, and a vehicle headlight control system.

BACKGROUND ART

In a well-known technique, the optical axis direction of a headlight of a vehicle body is controlled in accord with a pitch angle (elevation angle) of the vehicle with respect to a road surface. For the control of the optical axis, the vehicle is provided with an inclination sensor to detect the pitch angle of the vehicle. The optical axis direction is controlled on the basis of a detection value of the sensor (see PTL 1).

Further, in a well-known technique, a vehicle height sensor is provided to either a front wheel or a rear wheel of a vehicle. The detection value of the vehicle height sensor is used as a basis to estimate a displacement angle of the vehicle height on the side of the wheel not provided with the vehicle height sensor. Then, using the estimate value and the detection value of the vehicle height sensor, a pitch angle of the vehicle is calculated. In accord with the calculated pitch angle, the optical axis of the headlight is appropriately controlled (see PTL 2).

CITATION LIST

Patent Literature

[PTL 1] JP-A-2002-337600
[PTL 2] JP-A-H09-286274

SUMMARY

Technical Problem

The techniques described in the patent documents set forth above enable emission of light with an appropriate optical axis and thus are effective in the case where the pitch angle of the vehicle varies in a short time in a travel such as on a bumpy road. However, in the case of a travel on a comparatively long road, such as a sloping road, these techniques raise a problem that light is not emitted in a direction in which the light should originally be emitted.

In light of the matters set forth above, the present invention has as its object to provide an apparatus for controlling a vehicle headlight, the apparatus being able to control the optical axis of the headlight to an appropriate direction in a travel on a sloping road or the like. More particularly, the present invention has an object of reducing the probability of calculating a wrong road pitch angle on a sloping road, in calculating a road pitch angle on the basis of an output of an inclination sensor that detects an inclination angle of a vehicle body with respect to a reference plane (e.g., horizontal plane) that is fixed with respect to the vertical direction, in a control of an optical axis direction in accord with a road pitch angle of the vehicle body.

Solution to Problem

In order to achieve the above object, as recited in claim 1, there is provided a vehicle headlight control apparatus controls an optical axis direction of a head lamp (1) of a vehicle. The vehicle head lamp control apparatus includes: absolute pitch angle acquiring means (105) that acquires an absolute pitch outputted from an inclination sensing means (4) which detects an absolute pitch angle which is a pitch angle of a vehicle body with respect to a reference plane which is fixed with respect to a vertical direction; gradient related quantity acquiring means (110) that acquires a gradient related quantity outputted from a gradient related quantity detection sensor which detects a gradient related quantity capable of specifying a gradient of a road surface; road pitch angle calculating means (120 to 170) that calculates a pitch angle of a vehicle with respect to a road surface on the basis of the absolute pitch angle acquired by the absolute pitch angle acquiring means (105) and the gradient related quantity acquired by the gradient related quantity acquiring means (110); and optical axis controlling means (175) that controls an optical axis direction of the head lamp on the basis of the road pitch angle calculated by the road pitch angle calculating means (120 to 170).

Thus, a road pitch angle based on an absolute pitch angle is calculated using a gradient related quantity that can specify the gradient of a road surface. This can reduce the probability of calculating a wrong road pitch angle on a sloping road.

A recited in claim 2, in the head lamp control apparatus, the gradient related quantity acquiring means (110) may detect, as the gradient related quantity, a quantity that varies in accord with the altitude change of the vehicle. When the gradient related quantity is a quantity that varies in accord with the altitude change, the gradient of a road surface can be specified on the basis of a variation in the altitude of the vehicle.

As recited in claim 3, the head lamp control apparatus may use an atmospheric pressure as a quantity that changes in accord with the altitude change of the vehicle. When an atmospheric pressure is used as the quantity that changes in accord with the altitude change of the vehicle, the gradient of the road surface can be appropriately specified using a relationship between altitude and atmospheric pressure.

As recited in claim 4, in the head lamp control apparatus, the road pitch angle calculating means (120 to 170) may determine whether or not the gradient of a road surface falls within a predetermined range with respect to a horizontal plane, may use the present value of the absolute pitch angle as the latest value of the road pitch angle when the gradient of the road surface falls within the predetermined range with respect to the horizontal plane, and may prevent the present value of the absolute pitch angle from being reflected to the road pitch angle when the gradient of the road surface is out of the predetermined range with respect to the horizontal plane.

Thus, when the gradient of a road surface is within a predetermined range with respect to a horizontal plane, the present value of the absolute pitch angle is used as the latest value of the road pitch angle. On the other hand, when the gradient of the road surface is out of the predetermined range with respect to the horizontal plane, the present value of the absolute pitch angle is prevented from being reflected to the road pitch angle. This reduces the probability of calculating a wrong road pitch angle on a sloping road.

The road pitch angle may change in either of the following cases. Specifically, in the case where the balance of the load imposed on the vehicle has varied when, for example, a person has got in/off the vehicle or packages have been loaded/unloaded on/from the vehicle, or in the case where the vehicle has been accelerated/decelerated (i.e. when inertia force has been caused in the vehicle).

The change in the road pitch angle due to the change in the balance of the load does not occur very often but has a characteristic that, once the road pitch angle has changed, the changed angle is retained for a while. On the other hand, the change in the road pitch angle due to acceleration/deceleration occurs comparatively very often but has a characteristic that the duration of the change is short.

When the change in the road pitch angle due to the change in the movable load alone is desired to be followed in using the road pitch angle for the control of an optical axis, the need to frequently update the value of the road pitch angle is low. In this case, as mentioned above, the present value of the absolute pitch angle is used as the latest value of the road pitch angle. On the other hand, the update of the road pitch angle will not be delayed if it is updated when the gradient of the road surface is small, or if the present value of the absolute pitch angle is ensured not to be reflected to the road pitch angle when the gradient is not small.

As recited in claim 5, in the head lamp control apparatus, the road pitch angle calculating means (120 to 170) may use, as the road pitch angle, a difference between a road gradient corresponding to the gradient related quantity and the absolute pitch angle.

Thus, the influence of the road gradient is removed from the absolute pitch angle to thereby obtain a road pitch angle. With this method, a road pitch angle can also be detected on a road other than a horizontal road.

As recited in claim 6, the head lamp control apparatus may include a vehicle speed acquiring means (115) for acquiring a vehicle speed signal from a vehicle speed sensor (3) for outputting the vehicle speed signal; and the road pitch angle calculating means (120 to 170) may calculate the latest value of the road pitch angle when the variation of the vehicle speed that is in accord with the vehicle speed signal acquired by the vehicle speed acquiring means (115) is smaller than a reference value, and may prevent the present value of the absolute pitch angle from being reflected to the road pitch angle when a variation of the vehicle speed acquired by the vehicle speed acquiring means (115) is larger than the reference value.

Thus, there is a low probability that the detection result of the inclination sensing means (4) is influenced by something other than the rate of acceleration, i.e. the absolute pitch angle, that is based on speeding up or slowing down of the vehicle (specifically, influenced by inertia force).

The bracketed symbols in the above description indicate, for the sake of convenience, correlation of the terms used in the Means for Solving the Problems, with the specific objects that exemplify the terms in the embodiments described later.

DESCRIPTION OF THE EMBODIMENTS

Figure 1:
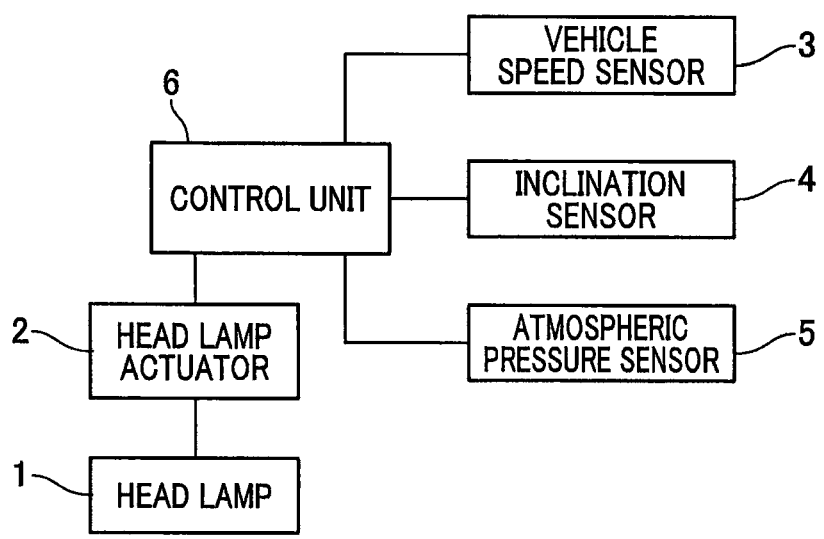
FIG. 1 illustrates a vehicle head lamp control apparatus, according to an embodiment of the present invention.

Hereinafter is described a first embodiment of the present invention. FIG. 1 illustrates a configuration of a vehicle head lamp control system, according to the present embodiment.

The vehicle head lamp control system is installed in a vehicle to control two head lamps (corresponding to the "head lamp" in the claims) 1 which are mounted to the left and the right of a vehicle. The vehicle head lamp control system includes a head lamp actuator 2, a vehicle speed sensor 3, an inclination sensor 4, an atmospheric pressure sensor 5, and a control unit 6.

The head lamp actuator 2 controls the optical axis directions of the head lamps 1. The head lamp actuator 2 has, for each head lamp 1, a swivel motor that changes (i.e. swivels) the light emission direction of the head lamp 1, in terms of the right-and-left direction of the vehicle, and a leveling motor that changes the light emission direction of the head lamp 1, in terms of the up-and-down direction of the vehicle.

The vehicle speed sensor 3 outputs a vehicle speed signal to the control unit 6, in accord with the number of rotations per unit time of the wheels. The control unit 6 is able to specify the speed of the vehicle on the basis of the vehicle speed signal.

The inclination sensor 4 detects a pitch angle (hereinafter referred to as absolute pitch angle) of the vehicle body with respect to a horizontal plane (corresponding to an example of the reference plane fixed with respect to the vertical direction), and outputs the detected absolute pitch angle. Such a sensor generally makes use of an electrical method to detect the position of an object which is movable by gravity (e.g., ball). It should be appreciated that the absolute pitch angle is positive when the height of the vehicle nose lowers and negative when the height of the vehicle tail lowers.

The atmospheric pressure sensor 5 (corresponding to an example of the gradient related quantity acquisition sensor) detects the atmospheric pressure at the position where the vehicle is located and outputs the value of the detected atmospheric pressure. The atmospheric pressure sensor 5 may be mounted at any position if only the position ensures a low probability for the atmospheric pressure sensor 5 to be exposed to water or wind. For example, the atmospheric pressure sensor 5 may be provided inside or outside the vehicle cabin. Atmospheric pressure varies in accord with the change of altitude. Therefore, the gradient of a road surface with respect to a horizontal plane can be specified on the basis of the variation of the atmospheric pressure.

The control unit 6 (corresponding to an example of the vehicle head lamp control apparatus) is an electronic control unit that includes a microcomputer and the like. The control unit 6 has a storage medium (e.g., ROM) in which a program is recorded in advance. When the program is executed, a process for controlling the optical axes of the head lamps 1 is carried out.

Figure 2:
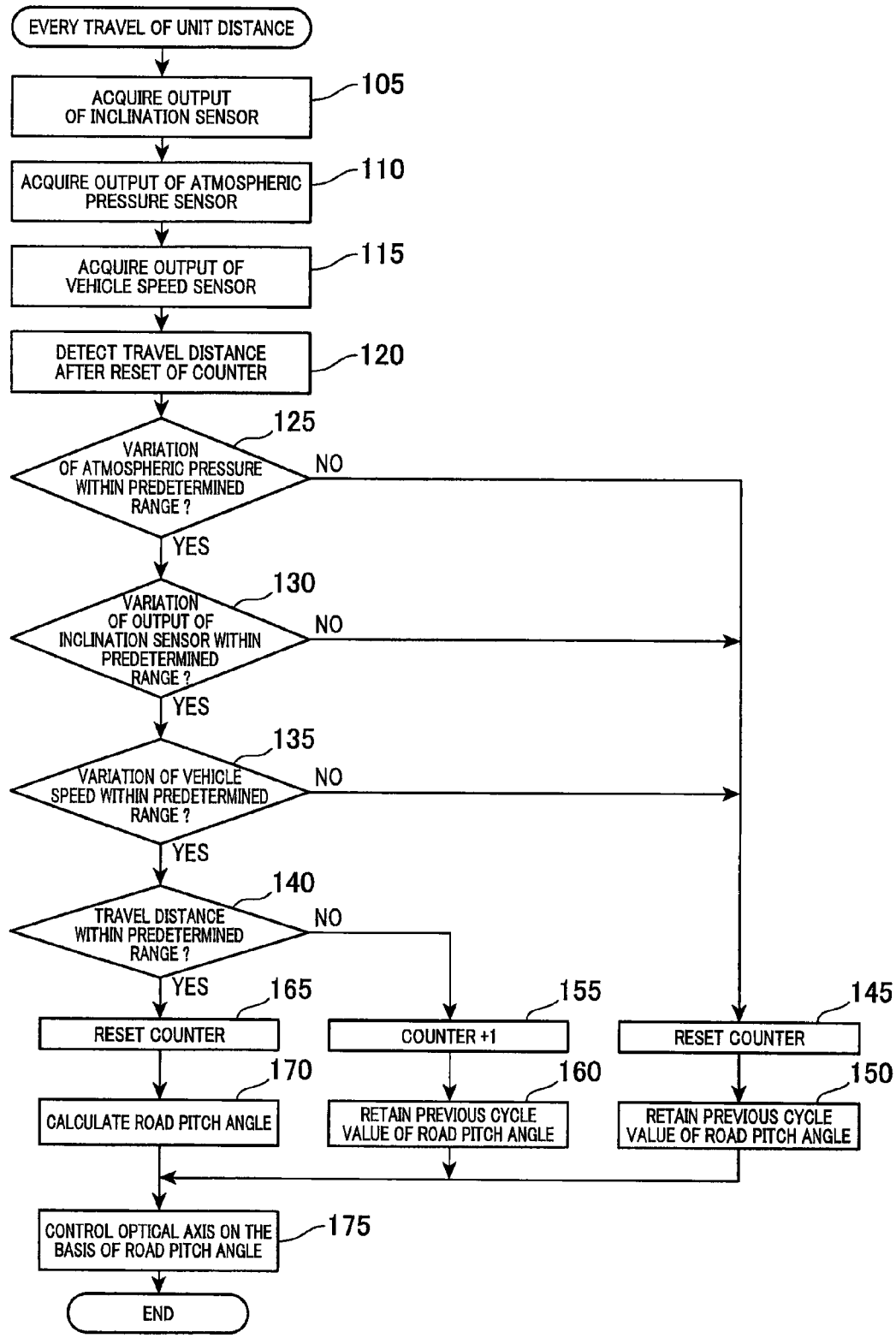
FIG. 2 is a flow diagram illustrating a process performed by a control unit in a first embodiment.

Hereinafter is described an operation of the vehicle head lamp control system 1 when the head lamps 1 are lit (e.g., in nighttime travel or in passing a tunnel). FIG. 2 is a flow diagram illustrating a process which is repeatedly performed by the control unit 6.

The control unit 6 is ensured to repeatedly perform the process shown in FIG. 2 at every travel of a predetermined distance L (e.g., 1 m) when a main power supply (e.g., ignition: IG) of the vehicle is turned on and the head lamps 1 are lit.

Hereinafter is described an example in which the vehicle starts traveling on a sloping road (e.g., with an uphill gradient of 1°). First, at step 105, the control unit 6 acquires an output signal of an absolute pitch angle that has been detected and outputted by the inclination sensor 4. Then, at step 110, the control unit 6 acquires an output signal indicating an atmospheric pressure value that has been detected and outputted by the atmospheric pressure sensor 5. Then, at step 115, the control unit 6 acquires a vehicle speed signal that has been outputted by the vehicle speed sensor 3.

Then, at step 120, the control unit 6 detects a unit travel distance after a counter is reset. A value of the counter refers to a numerical value which is changed at steps 145, 155 and 165 described later. A travel distance after the counter is reset is obtained by multiplying the value of the counter by the predetermined distance L.

Then, at step 125, the control unit 6 determines whether or not the atmospheric pressure variation is within a predetermined value (specifically, atmospheric pressure variation reference value). Specifically, the control unit 6 calculates a value most likely to be correct (e.g. using least-square method) as a variation of the atmospheric pressure per unit travel distance (the value is positive whether the variation increases or decreases). The calculation is based on the detection values derived from the atmospheric pressure sensor at step 110 of the present cycle and at step 110 of the previous cycle and the preceding N number of cycles (N is an integer of 1 or more) (e.g., detection values of the atmospheric pressure sensor acquired ten times in the past). Then, the control unit 6 determines whether or not the calculated most-likely-to-be-correct variation is smaller than the atmospheric pressure variation reference value.

The atmospheric pressure variation reference value used here is a variation of 1.75 Pa per 100 m travel (e.g. $1.75 \times 10^{-2}$ Pa/m). The reason for this is to determine whether or not a road gradient with respect to a horizontal plane is within an angular range of ±0.1° or less. In other words, at step 125, it is determined whether or not the gradient of a road surface is within a predetermined range (±0.1° or less) with respect to a horizontal plane.

In the repetition of the process shown in FIG. 2, one cycle correspond to steps 105 to 175. When the present cycle is the $N^{th}$ or less cycle, the control unit 6 sets, as a provisional value of the atmospheric pressure variation, a value larger than the atmospheric pressure variation reference value. Thus, when the present cycle is the $N^{th}$ or less cycle, the control unit 6 determines that the atmospheric pressure variation is not smaller than the atmospheric pressure variation reference value (NO at step 125). Then, the process proceeds to step 145.

At step 145, the value of the counter is reset to zero. Then, control proceeds to step 150 where the control unit 6 retains the previous cycle value (value updated last) as a value of the road pitch angle. Since the vehicle has just started traveling in the present example, a predetermined initial value (e.g., 0°) may be used as the road pitch angle in place of the previous cycle value. Alternatively, the value updated last in the previous travel may be read from a nonvolatile storage medium (e.g., flash memory of the control unit 6). In this case, the control unit 6 is ensured to record the road pitch angle calculated at step 170, which will be described later, on the storage medium.

After step 150, control proceeds to step 175 where the optical axis directions of the head lamps 1 are controlled on the basis of the present value of the road pitch angle. For example, when the road pitch angle is 0°, the up-and-down directions of the optical axes are ensured to be adjusted to a predetermined reference optical axis direction. The reference optical axis direction is fixed to the vehicle. For example, the reference optical axis direction coincides with the longitudinal direction of the vehicle (coincides with the vehicle's forward direction which is the horizontal direction, when the vehicle is located on a horizontal road surface). The right-and-left directions of the optical axes may be predetermined directions or may be ensured to vary in accord with the steering angle of the vehicle. After step 175, the process returns to step 105.

After that, the processing of steps 105, 110, 115, 120, 125, 145, 150 and 175 are repeated in this order for the N number of times. At steps 105, 110, 115 and 120 of each cycle, the control unit 6 acquires the outputs of the inclination sensor 4, the atmospheric 25 pressure sensor 5 and the vehicle speed sensor 3, and accumulates the absolute pitch angle, the atmospheric pressure and the vehicle speed in the storage medium, such as RAM. During this period, the counter is kept being reset to zero (step 145), the road pitch angle is not updated (step 150), and the up-and-down directions of the optical axes remain unchanged (step 175).

In the processings of steps 105 to 175 for the $(N+1)^{th}$ time, the control unit 6 is able to calculate a variation of the atmospheric pressure at step 125 following steps 105, 110, 115 and 120 on the basis of the atmospheric pressures acquired from the atmospheric pressure sensor 5 in the previous and the preceding N number of cycles and in the present cycle, and determines whether or not the resultant variation is within the atmospheric pressure variation reference value.

In the present example, the vehicle still travels on the sloping road (e.g., with an uphill gradient of 1°). Therefore, the determination result at step 125 is negative (NO at step 125). Then, control proceeds to step 145 where the value of the counter is reset to zero. At the subsequent step 150, the control unit 6 retains the previous cycle value as a value of the road pitch angle. Then, at step 175, the control unit 6 controls the optical axis directions of the head lamps 1 on the basis of the present value of the road pitch angle. In this case, however, the up-and-down directions of the optical axes remain unchanged because the road pitch angle is the same as the previous cycle value.

After that, while the vehicle keeps traveling on the sloping road, steps 105, 110, 115, 120, 125, 145, 150 and 175 are repeated in this order. At steps 105, 110, 115 and 120 of each cycle, the control unit 6 acquires the outputs of the inclination sensor 4, the atmospheric pressure sensor 5 and the vehicle speed sensor 3, and accumulates the absolute pitch angle, the atmospheric pressure and the vehicle speed in the storage medium, such as RAM. During this period, the value of the counter is kept being reset to zero (step 145), the road pitch angle is not updated (step 150), and the up-and-down directions of the optical axes remain unchanged (step 175).

Then, the uphill road comes to an end and the vehicle starts traveling on a horizontal road (with a gradient of ±1°. While repeating steps 105 to 175 in this order on the horizontal road, the control unit 6 eventually makes a determination at step 125 that the atmospheric pressure variation is within the atmospheric pressure variation reference value (YES at step 125).

Then, the control unit 6 allows the process to proceed to step 130 to determine whether or not the variation of the absolute pitch angle acquired from the inclination sensor 4 is within a predetermined value (specifically, the absolute pitch angle reference variation). Specifically, the control unit 6 calculates a standard deviation of the detection values of absolute pitch angle acquired at step 105 of the present cycle and at step 105 of the previous and the preceding N number of cycles, and determines whether or not the calculated standard deviation is smaller than the absolute pitch angle reference variation.

The absolute pitch angle reference variation is a reference value used for determining whether or not the vehicle is in a condition of traveling on a bumpy road to drastically vary the absolute pitch angle. For example, the absolute pitch angle reference variation is 20°. The reason for this is that, when the up-and-down directions of the optical axes are controlled in accord with the condition where the vehicle travels on a bumpy road to drastically vary the absolute pitch angle, the road pitch angle can no longer be correctly calculated and, as a result, there will be a high probability that light is not emitted in appropriate directions.

In the present example, after the vehicle's entry into the horizontal road, the condition that the variation of the absolute pitch angle is smaller than the absolute pitch angle reference variation (YES at step 130) continues for a while. In this case, the control unit 6 allows the process to proceed to step 135.

At step 135, the control unit 6 calculates a variation of vehicle speed on the basis of a vehicle speed pulse signal acquired from the vehicle speed sensor 3, and determines whether or not the calculated variation of vehicle speed is within a predetermined value (specifically, vehicle speed reference variation). Specifically, the control unit 6 calculates a value most likely to be correct (e.g. using least-square method) as a variation of vehicle speed per unit time (the value is positive whether the variation increases or decreases), on the basis of vehicle speed signals acquired at step 115 of the present cycle and at step 115 of the previous and the preceding N number of cycles. Then, the control unit 6 determines whether or not the calculated most-likely-to-be-correct variation is smaller than the vehicle speed reference variation.

The vehicle speed reference variation is a reference value for determining whether or not the vehicle is in a condition that the effect of inertia force appears in the detection result of the inclination sensor 4 to an unignorable extent, as a result of the acceleration and deceleration of the vehicle. For example, the vehicle speed reference variation is 2 m/s$^2$.

In the present example, after entry into the horizontal road, the vehicle is continuously in a condition that the variation of the vehicle speed is smaller than the vehicle speed reference variation (YES step 135). In this case, the control unit 6 allows the process to proceed to step 140.

At step 140, the control unit 6 determines whether or not the travel distance calculated at step 120 is equal to or more than a predetermined value (specifically, reference travel distance). For example, the reference travel distance is 100 m.

In the present example, the value of the counter is zero at step 120 and thus the travel distance is also zero. Accordingly, the control unit 6 determines that the travel distance is smaller than the reference travel distance (NO at step 140) and allows the process to proceed to step 155. At step 155, the value of the counter is incremented by 1. Thus, the value of the counter turns from 0 to 1 in the present example.

Then, at step 160, the previous cycle value is retained as the value of road pitch angle. Then, at step 175, the control unit 6 controls the optical axis directions of the head lamps 1 on the basis of the present value of road pitch angle. However, the up-and-down directions of the optical axes remain unchanged because the road pitch angle is the same as the previous cycle value.

After that, the vehicle keeps traveling on the horizontal road at a constant speed without traveling on a bumpy road surface. Then, the control unit 6 repeats the processings of steps 105, 110, 115, 120, 125, 130, 135, 140, 155, 160 and 175 in this order. Thus, the value of the counter is incremented by 1 every time the vehicle travels the distance L.

Then, the vehicle travels on a bumpy road surface before the value of the counter turns to a value corresponding to the reference travel distance (i.e. reference travel distance/L), and thus the variation of the absolute pitch angle exceeds the absolute pitch angle reference variation. In this case, the control unit 6 determines at step 130 that the variation of the absolute pitch angle has exceeded the absolute pitch angle reference variation (NO at step 130), and allows the process to proceed to step 145. At step 145, the counter is reset to zero. At the subsequent step 150, the control unit 6 retains the previous cycle value of the road pitch angle. At step 175, the control unit 6 controls the optical axis directions in accord with the road pitch angle, but allows the up-and-down directions of the optical axes to remain unchanged.

After that, the vehicle keeps traveling on the horizontal road at a constant speed without traveling on a bumpy road surface. Then, the control unit 6 repeats the processings of steps 105, 110, 115, 120, 125, 130, 135, 140, 155, 160 and 175 in this order. Thus, the value of the counter increases from 0, being incremented by 1 every time the vehicle travels the distance L.

Then, the vehicle is suddenly accelerated or decelerated before the value of the counter reaches a value corresponding to the reference travel distance (i.e. reference travel distance/L) and thus the variation of the vehicle speed exceeds the vehicle speed reference variation. In this case, the control unit 6 determines at step 135 that the variation of the vehicle speed has exceeded the vehicle speed reference variation (NO at step 135) and allows the process to proceed to step 145. At step 145, the counter is reset to zero. At step 150, the previous cycle value of the road pitch angle is retained. At step 175, the control unit 6 controls the optical axis directions in accord with the road pitch angle, but allows the up-and-down directions of the optical axes to remain unchanged.

After that, the vehicle keeps traveling on the horizontal road at a constant speed without traveling on a bumpy road surface. Then, the control unit 6 repeats the processings at steps 105, 110, 115, 120, 125, 130, 135, 140, 155, 160 and 175 in this order. Thus, the value of the counter increases from 0, being incremented by 1 every time the vehicle travels the distance L. Then, the value of the counter reaches or exceeds the value corresponding to the reference travel distance (i.e. reference travel distance/L).

Then, the control unit 6 determines at step 140 that the travel distance has exceeded the reference travel distance (YES at step 140). Then, control proceeds to step 160 where the counter is reset. Then, control proceeds to step 170 where a road pitch angle is calculated. Specifically, the road pitch angle is updated to the present value of the absolute pitch angle acquired at the preceding step 105 (i,e. step 105 in the processings of steps 105 to 175 of the present cycle). Thus, the present value of the absolute pitch angle becomes the latest value of the road pitch angle.

Figure 3:
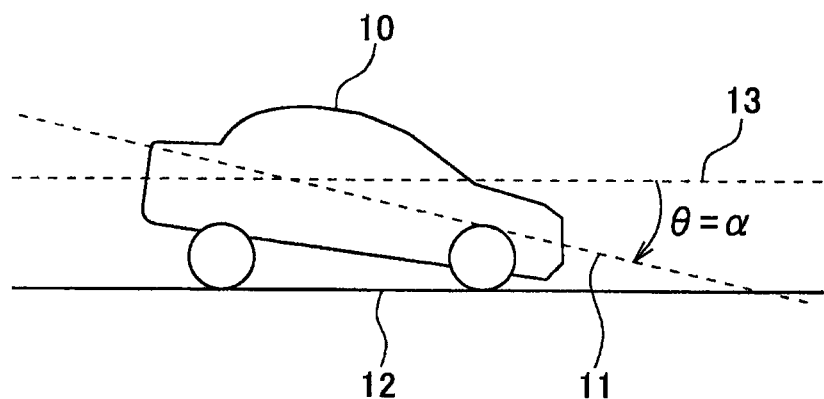
FIG. 3 is a diagram illustrating a relationship between absolute pitch angle α and road pitch angle θ.

As in an example shown in FIG. 3 (there is neither vehicle rolling nor road surface inclination in lateral direction), a present absolute pitch angle α detected by the atmospheric pressure sensor 5 is an angle of a reference plane 11 of the vehicle body with respect to a horizontal plane 13, and the horizontal plane 13 is parallel to a road surface 12. Specifically, at step 170, a road pitch angle θ between the reference plane 11 of the vehicle body and the road surface 12 will have a value equivalent to that of the absolute pitch angle α. It should be appreciated that the reference plane 11 of the vehicle body is fixed to the vehicle body; and the reference plane 11 becomes parallel to the road surface 12 when the road pitch angle θ of the vehicle body is zero. FIG. 3 illustrates a vehicle with a road pitch angle causing the front part of the vehicle body to incline downward. The cause of this road pitch angle may be that the movable load in the front part of the vehicle is very large.

Then, at step 175, the control unit 6 controls the optical axis directions of the head lamps 1 on the basis of the present value of the road pitch angle. For example, when the road pitch angle is +1° (a positive value expresses that the height of the vehicle nose is lowered, while a negative value expresses that the height of the vehicle tail is lowered), the control unit 6 changes, by −1° (a positive value expresses downward change, while a negative value expresses upward change), the up-and-down directions of the optical axes with respect to the predetermined reference optical axis direction so that the effect of the road pitch angle is cancelled. Thus, irrespective of the change in the road pitch angle, the directions of the optical axes with respect to the road surface are stabilized.

After that, the vehicle keeps traveling on the horizontal road at a constant speed without traveling on a bumpy road surface. Then, the control unit 6 repeats the processings of steps 105, 110, 115, 120, 125, 130, 135, 140, 155, 160 and 175 in this order. The reason why control proceeds from step 140 to step 155 is that, as mentioned above, the counter is reset at step 165. Thus, the value of the counter increases from 0, being incremented by 1 every time the vehicle travels the distance L. Further, the updated road pitch angle is retained, and the up-and-down directions of the optical axes are maintained in accord with the road pitch angle.

When the value of the counter has reached or exceeded the value corresponding to the reference travel distance (i.e. reference travel distance/L), the control unit 6 again performs the processings of steps 105, 110, 115, 120, 125, 130, 135, 140, 165, 170 and 175 in this order. Then, using the present absolute pitch angle at the time as the latest value of the road pitch angle, the control unit 6 controls the optical axes of the head lamps 1 in the up-and-down directions in accord with the latest value.

In this way, the control unit 6 of the present embodiment calculates a road pitch angle with respect to a road surface, on the basis of the present value of an acquired absolute pitch angle and a variation of the atmospheric pressure (corresponding to an example of the gradient related quantity). In other words, using a gradient related quantity that can specify the gradient of a road surface, the control unit 6 calculates a road pitch angle on the basis of an absolute pitch angle to thereby reduce the probability of calculating a wrong road pitch angle on a sloping road. Further, as mentioned above, when the gradient related quantity varies in accord with the change of altitude, the control unit 6 is able to specify the gradient of the road surface on the basis of the variation of the altitude.

In addition, the control unit 6 determines whether or not the gradient of the road surface is within a predetermined range with respect to a horizontal plane. If the gradient of the road surface is within the predetermined range with respect to a horizontal plane, the control unit 6 uses the present value of the absolute pitch angle as the latest value of the road pitch angle. If the gradient of the road surface is not within the predetermined range with respect to a horizontal plane, the control unit 6 does not reflect the present value of the absolute pitch angle to the road pitch angle.

In this way, when the gradient of a road surface is within a predetermined range with respect to a horizontal plane (when an atmospheric pressure variation is within the atmospheric pressure variation reference value), the present value of the absolute pitch angle is used as the latest value of the road pitch angle. On the other hand, when the gradient of the road surface is not within the predetermined range with respect to a horizontal plane, the present value of the absolute pitch angle is not reflected to the road pitch angle. Thus, the probability of calculating a wrong road pitch angle on a sloping road is reduced.

The reason for this is that, the atmospheric pressure sensor 5 is required to have high accuracy or responsiveness in the case where a road pitch angle is detected on a sloping road having a specific gradient, comparing to the case where a road pitch angle is calculated on a horizontal road.

The road pitch angle may change in either of the following cases. Specifically, in the case where the balance of the load imposed on the vehicle has varied when, for example, a person has got in/off the vehicle or packages have been loaded/unloaded on/from the vehicle, or in the case where the vehicle has been accelerated/decelerated (i.e. when inertia force has been caused in the vehicle).

The change in the road pitch angle due to the change in the balance of the load does not occur very often but has a characteristic that, once the road pitch angle has changed, the changed angle is retained for a while. On the other hand, the change in the road pitch angle due to acceleration/deceleration occurs comparatively very often but has a characteristic that the duration of the change is short.

When the change in the road pitch angle due to the change in the movable load alone is desired to be followed in using the road pitch angle for the control of optical axes, the need to frequently update the value of the road pitch angle is low. In this case, as mentioned above, the present value of the absolute pitch angle is used as the latest value of the road pitch angle. On the other hand, the update of the road pitch angle is not regarded to be delayed if it is updated when the gradient of the road surface is small, and if the present value of the absolute pitch angle is ensured not to be reflected to the road pitch angle when the gradient is not small.

Further, when the variation of the vehicle speed is smaller than a reference value (vehicle speed reference variation), the control unit 6 calculates the latest value of the road pitch angle. When the variation of the vehicle speed is larger than the reference value (vehicle speed reference variation), the control unit 6 maintains the road pitch angle of the previous cycle without reflecting the present value of the absolute pitch angle to the road pitch angle. Thus, there is a low probability that the detection result of the inclination sensor 4 is influenced by something other than the rate of acceleration, i.e. the absolute pitch angle, that is based on speeding up or slowing down of the vehicle (specifically, influenced by inertia force).

(Second Embodiment)

Hereinafter, a second embodiment of the present invention is described comparing with the first embodiment. The hardware configuration of the vehicle head lamp control system of the present embodiment is the same as that of the first embodiment. In the present embodiment, the control unit 6 is ensured to perform a process shown in FIG. 4 in place of the process of FIG. 2 of the first embodiment.

Figure 4:
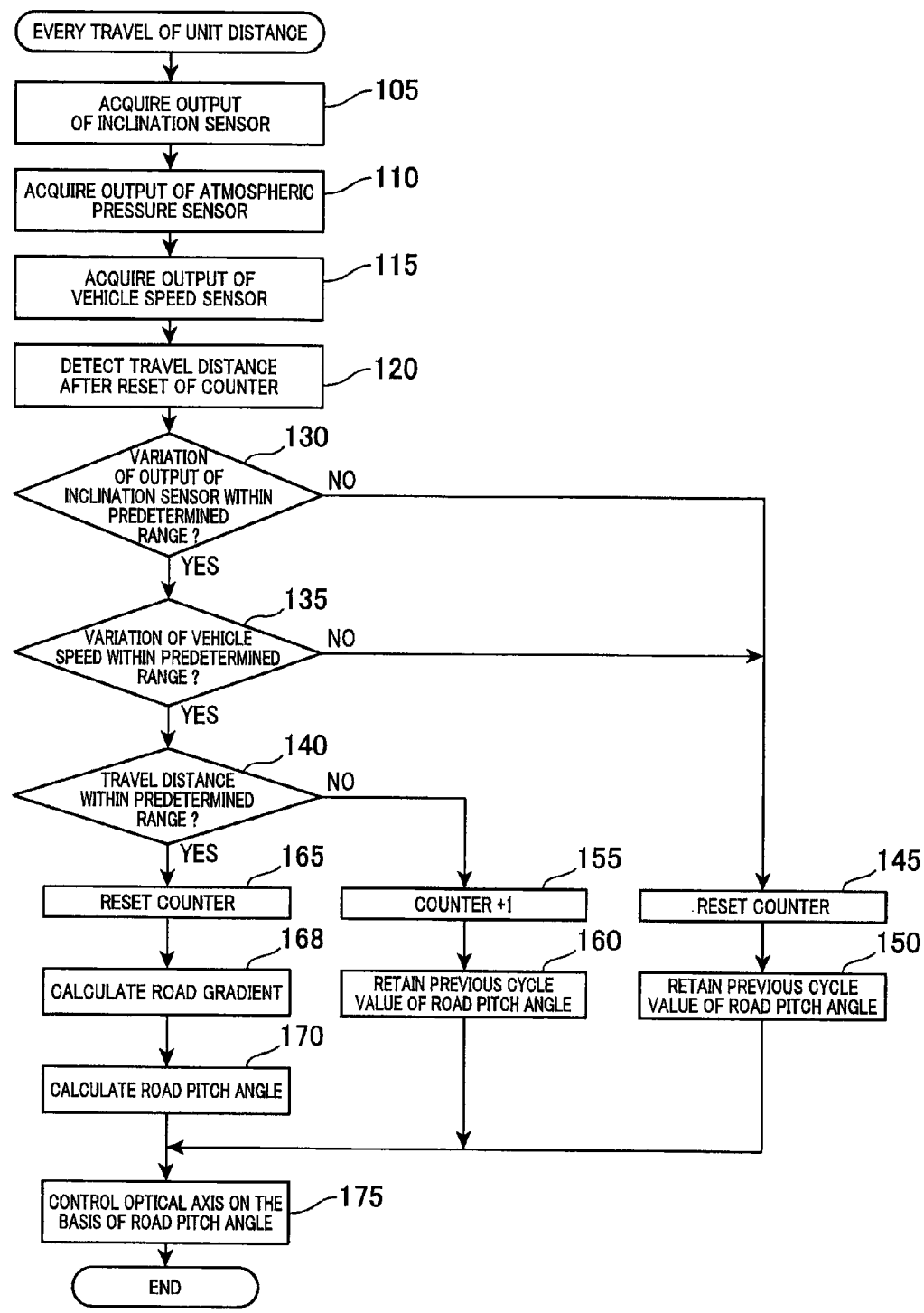
FIG. 4 is a flow diagram illustrating a process performed by a control unit in a second embodiment.

In FIGS. 2 and 4, the steps performing the same processings are designated with the same step number. The explanation on the processings illustrated in both of FIGS. 2 and 4 is omitted or simplified in the present embodiment.

Similar to the first embodiment, the following description is based on an example in which the vehicle starts traveling on a sloping road (e.g. with an uphill gradient of 1°). First, at step 105, the control unit 6 acquires an output signal of an absolute pitch angle detected and outputted by the inclinations sensor 4. Then, at step 110, the control unit 6 acquires an output signal of an atmospheric pressure detected and outputted by the atmospheric pressure sensor 5. Then, at step 115, the control unit 6 acquires a vehicle speed signal outputted from the vehicle speed sensor 3. Then, at step 120, the control unit 6 detects a travel distance after the counter is reset.

Subsequent to step 120, control proceeds to step 130 unlike the first embodiment. At step 130, the control unit 6 determines whether or not the absolute pitch angle acquired from the inclination sensor 4 is within a predetermined value (specifically, absolute pitch angle reference variation). Specifically, the control unit 6 calculates a value most likely to be correct (e.g. using least-square method) as a variation of the absolute pitch angle per unit travel distance (the value is positive whether the variation increases or decreases). The calculation is based on the detection values acquired at step 105 of the present cycle and at step 105 of the previous and the preceding N number of cycles. Then, the control unit 6 determines whether or not the calculated most-likely-to-be-correct variation is smaller than the absolute pitch angle reference variation If the present cycle is the $N^{th}$ or less cycle since the start of repetition of the processings of steps 105 to 175 of FIG. 4, the control unit 6 sets, as a provisional value of the variation of the absolute pitch angle, a value larger than the absolute pitch angle variation reference value. Thus, if the present cycle is the $N^{th}$ or less cycle, the control unit 6 determines that the absolute pitch angle variation is not within the absolute pitch angle variation reference value (NO at step 130). Then, the process proceeds to step 145.

At step 145, the control unit resets the value of the counter to zero. At the subsequent step 150, the control unit 6 retains the previous cycle value as a value of the road pitch angle. In the present example, since the vehicle has just started traveling, a predetermined initial value (e.g., 0°) may be used as the road pitch angle in place of the previous cycle value. Alternatively, the value updated last in the travel of the previous cycle may be read from a nonvolatile storage medium. In this case, the control unit 6 is ensured to record the road pitch angle calculated at step 170, which will be described later, on the storage medium. Then, at the subsequent step 175, the control unit 6 controls the optical axis directions of the head lamps 1 on the basis of the present value of the road pitch angle.

After that, the control unit 6 repeats the processing of steps 105, 110, 115, 120, 130, 145, 150 and 175 in this order for N number of times. At steps 105, 110, 115 and 120 of each cycle, the control unit 6 acquires the outputs of the inclination sensor 4, the atmospheric pressure sensor 5 and the vehicle speed sensor 3, and accumulates the absolute pitch angle, the atmospheric pressure and the vehicle speed in the storage medium, such as RAM. During this period, the counter is kept being reset to zero (step 145), the road pitch angle is not updated (step 150), and the up-and-down directions of the optical axes are not changed (step 175).

In the processings of steps 105 to 175 for the $(N+1)^{th}$ time, the control unit 6 is able to calculate a variation of the absolute pitch angle on the basis of the absolute pitch angles acquired from the inclination sensor 4 in the previous and the preceding N number of cycles and in the present cycle, and determines whether or not the resultant variation is within the absolute pitch angle variation reference value.

In the present example, the vehicle still travels on the sloping road (e.g., with an uphill gradient of 1°) but does not travel on a bumpy road surface. The vehicle is in a condition for a while that the variation of the absolute pitch angle is smaller than the absolute pitch angle reverence variation. Accordingly, the determination result at step 130 is affirmative (YES at step 130). Then, control proceeds to step 135.

At step 135, the control unit 6 calculates a variation of vehicle speed on the basis of a vehicle speed pulse signal acquired from the vehicle speed sensor 3 and determines whether or not the calculated variation of vehicle speed is within a predetermined value (specifically, vehicle speed reference variation).

In the present example, the vehicle still travels on the sloping road (e.g., with an uphill gradient of 1°) and keeps travelling at a constant speed. Accordingly, the vehicle is in a condition for a while that the variation of the vehicle speed is smaller than the vehicle speed reference variation (YES at step 135). In this case, the control unit 6 allows the process to proceed to step 140.

At step 140, the control unit 6 determines whether or not the travel distance calculated at step 120 is equal to or more than a predetermined value (specifically, reference travel distance). The reference travel distance of the present embodiment may, for example, be 10 in or 5.7 m. The quantity of 5.7 m corresponds to a travel distance in which the atmospheric pressure changes by 0.1 Pa (corresponding to a level difference of 1 cm) at a road gradient of 0.1°.

In the present example, the value of the counter is zero at step 120 and thus the travel distance is also zero. Accordingly, the control unit 6 determines that the travel distance is smaller than the reference travel distance (NO at step 140) and allows the process to proceed to step 155. At step 155, the value of the counter is incremented by 1. Thus, the value of the counter turns from 0 to 1 in the present example.

Then, at step 160, the previous cycle value is retained as the value of road pitch angle. Then, at step 175, the control unit 6 controls the optical axis directions of the head lamps 1 on the basis of the present value of the road pitch angle. However, the up-and-down directions of the optical axes remain unchanged because the road pitch angle is the same as the previous cycle value.

After that, the vehicle keeps traveling on the sloping road at a constant speed without traveling on a bumpy road surface. Then, the control unit 6 repeats the processings of steps 105, 110, 115, 120, 130, 135, 140, 155, 160 and 175 in this order. Thus, the value of the counter is incremented by 1 every time the vehicle travels the distance L. The value of the counter eventually reaches or exceeds a value corresponding to the reference travel distance (i.e. reference travel distance/L) while the vehicle travels on the sloping road.

The control unit 6 then determines at step 140 that the travel distance has exceeded the reference travel distance (YES at step 140). Then, control proceeds to step 165 where the counter is reset. Then, control further proceeds to step 168 where the control unit 6 calculates the gradient of the road surface on which the vehicle travels, on the basis of the atmospheric pressures acquired from the atmospheric pressure sensor 5 up to then.

Figure 5:
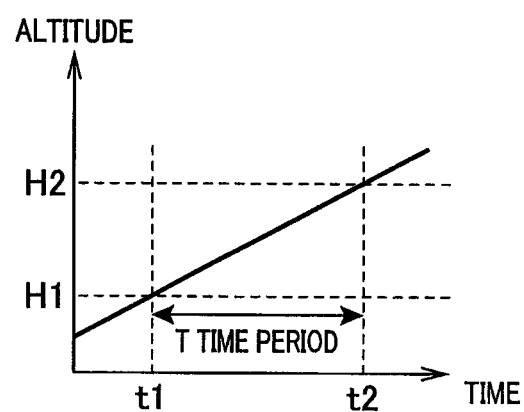
FIG. 5 is a diagram illustrating altitude change of a vehicle.

Specifically, as shown in FIG. 5, the control unit 6 calculates a decrement of the atmospheric pressure per time period T (time period from time t1 preceding the present time by time period T to present time t2, e.g. 100 msec) on the basis of the atmospheric pressures acquired at step 110 up to then. Based on the calculation result, the control unit 6 calculates an increment H2–H1 in the altitude of the vehicle per time period T. In calculating the increment H2–H1 per time period T on the basis of the decrement of the atmospheric pressure per time period T, the control unit 6 uses, as a basis, a table that indicates correlation between decrement in the atmospheric pressure and increment in the altitude. The table is recorded in advance in the storage medium (e.g., ROM) of the control unit. 6.

Figure 6:
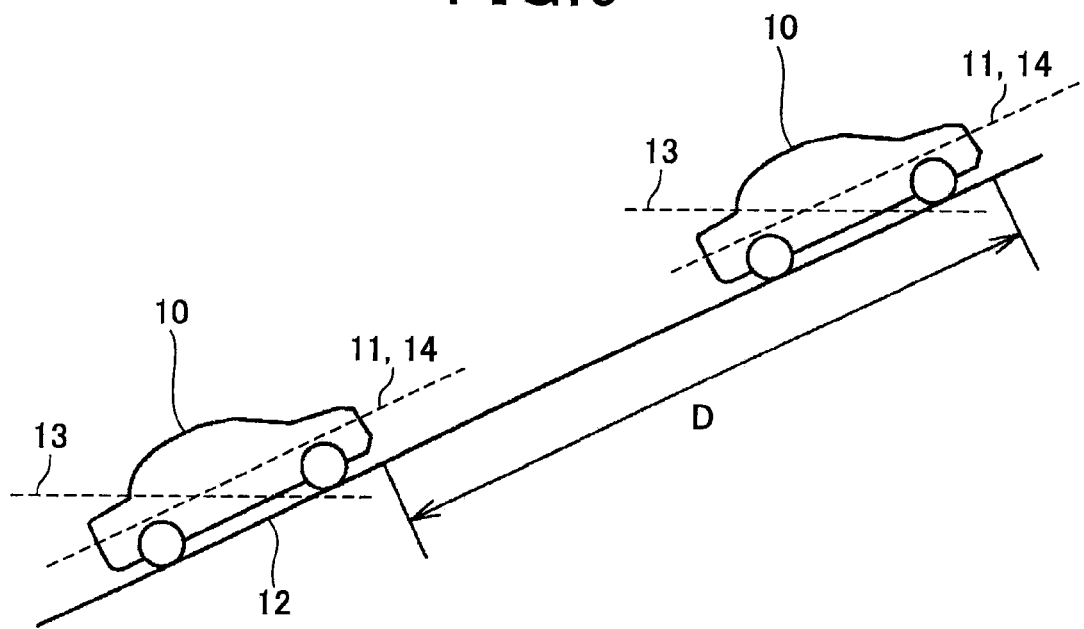
FIG. 6 is a diagram illustrating movement D of a vehicle 10.

Further, the control unit 6 calculates a travel distance D (see FIG. 6) of a vehicle 10 per time period T on the basis of the vehicle speeds acquired at step 115 up to then. Then, a value of arcsin ((H2–H1)/D) is used as the gradient of the road surface. In FIG. 6, a dotted line 11 indicates the reference plane of the vehicle, a solid line 12 indicates the road surface, a dotted line 13 indicates the horizontal plane and a dotted line 14 indicates the plane parallel to the road surface 12.

Figure 7:
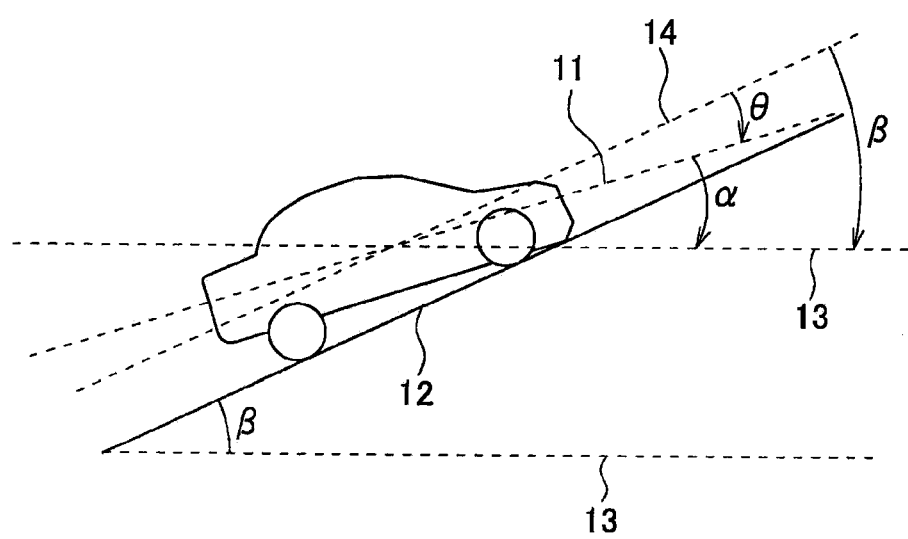
FIG. 7 is a diagram illustrating a relationship between absolute angle α, road gradient β and road pitch angle θ.

Then, control proceeds to step 170 where the control unit 6 calculates a road pitch angle on the basis of the road gradient calculated at step 168 and the absolute pitch angle calculated at preceding step 105. Specifically, as shown in FIG. 7 (there is neither vehicle rolling nor road surface inclination in lateral direction), the control unit 6 subtracts the present value of the absolute pitch angle α acquired at preceding step 105 from the present value of the road gradient β calculated at preceding step 168 and uses the value β–α resulting from the subtraction as the latest value of the road pitch angle θ.

Then, at step 175, the control unit 6 controls the up-and-down directions of the optical axes of the head lamps 1 in a manner similar to the first embodiment, on the basis of the latest value of the road pitch angle that has been updated at preceding step 170.

After that, the vehicle keeps traveling on an uphill road at a constant speed without traveling on a bumpy road surface. Then, the control unit 6 repeats the processings of steps 105, 110, 115, 120, 130, 135, 140, 155, 160 and 175 in this order. The reason why control proceeds from step 140 to step 155 is that the counter is reset as step 165 as mentioned above. Thus, the value of the counter increases from 0, being incremented by 1 every time the vehicle travels the distance L. Further, the updated road pitch angle is retained and the up-and-down directions of the optical axes are retained in accord with the retained road pitch angle.

Then, before the value of the counter reaches a value corresponding to the reference travel distance (i.e. reference travel distance/L), the vehicle finishes traveling up the hill and enters a horizontal road. In this case as well, the absolute pitch angle outputted from the inclination sensor 4 drastically changes. Accordingly, the control unit 6 allows the process to proceed to steps 105, 110, 115, 120 and 130. At step 130, the control unit 6 determines that the variation of the absolute pitch angle is larger than the pitch angle variation reference value (NO at step 130). Then, the process proceeds to step 145. After that, the counter is reset, and at step 150, the previous cycle value of the road pitch angle is retained. At step 175, the control unit 6 controls the optical axes of the head lamps 1 on the basis of the road pitch angle. However, the up-and-down directions of the optical axes remain unchanged.

After that, the vehicle keeps traveling on the horizontal road at a constant speed without traveling on a bumpy road surface. Then, the control unit 6 repeats the processings of steps 105, 110, 115, 120, 130, 135, 140, 155, 160 and 175. Thus, the value of the counter increases from 0, being incremented by 1 every time the vehicle travels the distance L. Further, the updated road pitch angle is retained and the up-and-down directions of the optical axes are maintained in accord with the updated road pitch angle.

When the value of the counter reaches or exceeds a value corresponding to the reference travel distance (i.e. reference travel distance/L), the control unit 6 again repeats the processings of steps 105, 110, 115, 120, 130, 135, 140 165, 168, 170 and 175 in this order. The control unit 6 obtains the difference β–α between the present absolute pitch angle α and the present road gradient β at the time, and uses the difference β–α as the latest value of the road pitch angle θ. Then, the control unit 6 controls the up-and-down directions of the optical axes of the head lamps 1 in accord with the latest value.

In this way, the control unit 6 of the present embodiment calculates a road pitch angle on the basis of the present value of the acquired absolute pitch angle and the variation of the atmospheric pressure (corresponding to an example of the gradient related quantity). Thus, the control unit 6 calculates a road pitch based on an absolute pitch angle, using the gradient related quantity that can specify the gradient of the road surface. This reduces the probability of calculating a wrong road pitch angle on a sloping road. Further, when the gradient related quantity changes in accord with the altitude change, the gradient of the road surface can be specified on the basis of the variation of the altitude.

The control unit 6 uses, as the road pitch angle θ, the difference β–α between the road gradient β corresponding to the gradient related quantity (specifically, the atmospheric pressure) and the absolute pitch angle α. Thus, the influence of the road gradient is removed from the absolute pitch angle to thereby obtain a road pitch angle. With this method, a road pitch angle can also be detected on a road other than a horizontal road and therefore the optical axis directions can be controlled following the road pitch angle that changes in a short time.

The control unit 6 calculates the latest road pitch angle when the variation of the vehicle speed is smaller than a reference value (vehicle speed reference variation). Further, when the variation of the vehicle speed is larger than the reference value (vehicle speed reference variation), the control unit 6 maintains the road pitch angle of the previous cycle without reflecting the present value of the absolute pitch angle to the road pitch angle. Thus, there is a low probability that the detection result of the inclination sensing means 4 is influenced by something other than the rate of acceleration, i.e. the absolute pitch angle, that is based on speeding up or slowing down of the vehicle (specifically, influenced by inertia force).

In the foregoing embodiments, the control unit 6 performs: step 105 to function as an example of the absolute pitch angle acquiring means; step 110 to function as an example of the gradient related quantity acquiring means; steps 120 to 170 to function as an example of the road pitch angle calculating means; and step 175 to function as an example of the optical axis controlling means.

(Other Embodiments)

Some embodiments of the present invention have so far been described. However, the scope of the present invention is not limited to the foregoing embodiments alone. The present invention shall encompass various modes that can realize the functions of the invention defining matters of the present invention.

For example, in the foregoing embodiments, the atmospheric pressure detected by the atmospheric pressure sensor 5 is used as a gradient related quantity that can specify the gradient of a road surface. However, this shall not be exclusively applied. For example, the altitude of the vehicle detected by a satellite navigation receiver (e.g., GPS receiver or quasi-zenith satellite navigation receiver) may be used as the gradient related quantity. For example, when an interferometric positioning GPS receiver is used, the accuracy of detecting altitude will be about several centimeters. Further, similar to the atmospheric pressure, the altitude of the vehicle detected by a satellite navigation receiver (corresponding to an example of the gradient related quantity detecting means) also corresponds to an example of a quantity that changes with the altitude change of the vehicle.

The first embodiment uses the gradient related quantity detecting means and the atmospheric pressure sensor 5. However, a level gauge may be used alternative to the atmospheric pressure sensor 5. This level gauge outputs a signal indicating whether a road surface is horizontal. However, the level gauge has to be mounted at a position that will not be influenced by the road pitch angle of the vehicle. Such a position may, for example, be the inside of a suspension that is intervened between the vehicle body and the wheels.

A gradient related quantity that can specify the gradient of a road surface may be derived from an acceleration sensor (e.g., 2-axis sensor or 3-axis sensor) that detects a change in the absolute pitch angle of a vehicle, the sensor being of a capacitance type, a piezoresistance type, or the like.

REFERENCE SIGNS LIST

1: Head lamp
2: Head lamp actuator
3: Vehicle speed sensor
4: Inclination sensor (inclination detecting means)
5: Atmospheric pressure sensor (gradient related quantity detecting means)
6: Control unit (vehicle head lamp control apparatus)
10: Vehicle
11: Reference plane
12: Road surface
13: Horizontal plane
14: Plane parallel to road surface
θ: Road pitch angle
α: Absolute pitch angle
β: Road gradient

The invention claimed is:

1. A vehicle headlight control apparatus that controls an optical axis direction of a vehicle head lamp, the vehicle headlight control apparatus comprising:
a processor configured to:
acquire an absolute pitch outputted from an inclination sensor for detecting an absolute pitch angle which is a pitch angle of a vehicle body with respect to a reference plane which is fixed with respect to a vertical direction;
acquire a gradient related quantity outputted from a gradient related quantity detection sensor which detects a gradient related quantity capable of specifying a gradient of a road surface;
calculate a pitch angle of a vehicle with respect to a road surface on the basis of the absolute pitch angle acquired by the processor and the gradient related quantity acquired by the processor; and
control an optical axis direction of the head lamp on the basis of the road pitch angle calculated by the processor, wherein
the processor is further configured to:
determine, based on the gradient related quantity, whether or not a gradient of a road surface falls within a predetermined range with respect to a horizontal plane, use a present value of the absolute pitch angle as a latest value of the road pitch angle when the gradient of the road surface falls within the predetermined range with respect to the horizontal plane, and prevent the present value of the absolute pitch angle from being reflected to the road pitch angle when the gradient of the road surface is out of the predetermined range with respect to the horizontal plane; and
acquire, as the gradient related quantity, an atmospheric pressure that changes in accordance with an altitude change of the vehicle.

2. The vehicle headlight control apparatus according to claim 1, wherein the processor is further configured to use, as the road pitch angle, a difference between a road gradient corresponding to a gradient related quantity and the absolute pitch angle.

3. The vehicle headlight control apparatus according to claim 2, wherein
the processor is further configured to:
acquire a vehicle speed signal from a vehicle speed sensor for outputting the vehicle speed signal,
calculate a latest value of a road pitch angle when a variation of the vehicle speed that is in accordance with the vehicle speed signal acquired by the processor is smaller than a reference value, and prevent a present value of the absolute pitch angle from being reflected to the road pitch angle when a variation of the vehicle speed acquired by the processor is larger than the reference value.

4. A vehicle headlight control method for controlling an optical axis direction of a head lamp of a vehicle, the vehicle headlight control method comprising:
a step of detecting, with a processor provided in a vehicle headlight control apparatus mounted to a vehicle, an absolute pitch angle that is a pitch angle of a vehicle body with respect to a reference plane that is fixed with respect to a vertical direction;
a step of detecting, with the processor, a gradient related quantity that can specify a gradient of a road surface;
a step of calculating, with the processor, a pitch angle of a vehicle with respect to the road surface on the basis of the absolute pitch angle and the gradient related quantity; and
a step of controlling, with the processor, an optical axis direction of the head lamp on the basis of the road pitch angle, wherein
the step of calculating a road pitch angle determines, based on the gradient related quantity, whether or not a gradient of a road surface falls within a predetermined range with respect to a horizontal plane, uses a present value of the absolute pitch angle as a latest value of the road pitch angle when the gradient of the road surface falls within the predetermined range with respect to the horizontal plane, and prevents the present value of the absolute pitch angle from being reflected to the road pitch angle when the gradient of the road surface is out of the predetermined range with respect to the horizontal plane, and the gradient related quantity is an atmospheric pressure that changes in accordance with an altitude change of a vehicle.

5. The vehicle headlight control method according to claim 4, wherein the step of calculating the road pitch angle uses, as the road pitch angle, a difference between a road gradient that is based on the gradient related quantity and the absolute pitch angle.

6. The vehicle headlight control method according to claim 5, wherein the step of calculating the road pitch angle calculates a latest value of the road pitch angle when a variation of a vehicle speed detected by a vehicle speed sensor is smaller than a reference value, and prevents a present value of the absolute pitch angle from being reflected to the road pitch angle when the variation of the vehicle speed is larger than the reference value.

7. A vehicle headlight control system that controls an optical axis direction of a head lamp of a vehicle, the vehicle headlight control system comprising:

an inclination detection sensor that detects an absolute pitch angle that is a pitch angle of a vehicle body with respect to a reference plane that is fixed with respect to a vertical direction;

a gradient related quantity detection sensor that detects a gradient related quantity that can specify a gradient of a road surface; and a processor configured to:
calculate a pitch angle of a vehicle with respect to a road surface on the basis of an absolute pitch angle acquired by the inclination sensor and a gradient related quantity acquired by the gradient related quantity detection sensor; and control an optical axis direction of the head lamp on the basis of a road pitch angle calculated by the processor, wherein the processor is further configured to determine, based on the gradient related quantity, whether or not a gradient of a road surface falls within a predetermined range with respect to a horizontal plane, use a present value of the absolute pitch angle as a latest value of the road pitch angle when the gradient of the road surface falls within the predetermined range with respect to the horizontal plane, and prevent the present value of the absolute pitch angle from being reflected to the road pitch angle when the gradient of the road surface is out of the predetermined range with respect to the horizontal plane, and the gradient related quantity detection sensor is an atmospheric pressure sensor that detects, as the gradient related quantity, an atmospheric pressure that changes in accordance with an altitude change of the vehicle.

8. The vehicle headlight control system according to claim 7, wherein the processor is further configured to use, as the road pitch angle, a difference between a road gradient that is based on the gradient related quantity and the absolute pitch angle.

9. The vehicle headlight control system according to claim 8, further comprising a vehicle speed sensor, wherein
the processor is further configured to calculate a latest value of the road pitch angle when a variation of vehicle speed detected by the vehicle speed sensor is smaller than a reference value, and prevent a present value of the absolute pitch angle from being reflected to the road pitch angle when the variation of the vehicle speed is larger than the reference value.

10. A vehicle headlight control apparatus that controls an optical axis direction of a vehicle head lamp, the vehicle headlight control apparatus comprising:

a processor configured to:
acquire an absolute pitch outputted from an inclination sensor for detecting an absolute pitch angle which is a pitch angle of a vehicle body with respect to a reference plane which is fixed with respect to a vertical direction;

acquire a gradient related quantity outputted from a gradient related quantity detection sensor which detects a gradient related quantity capable of specifying a gradient of a road surface;

calculate a pitch angle of a vehicle with respect to a road surface on the basis of the absolute pitch angle acquired by the processor and the gradient related quantity acquired by the processor; and control an optical axis direction of the head lamp on the basis of the road pitch angle calculated by the processor, wherein the processor is further configured to:
determine, based on the gradient related quantity, whether or not a gradient of the road surface falls within a predetermined range with respect to a horizontal plane, use a present value of the absolute pitch angle as a latest value of the road pitch angle when the gradient of the road surface falls within the predetermined range with respect to the horizontal plane, and prevent the present value of the absolute pitch angle from being reflected to the road pitch angle when the gradient of the road surface is out of the predetermined range with respect to the horizontal plane; and acquire, as the gradient related quantity, an altitude change of the vehicle detected by a satellite navigation receiver.

* * * * *